H. C. ATWOOD.
SHUTTER OPERATING ATTACHMENT FOR CAMERAS.
APPLICATION FILED JULY 12, 1916.

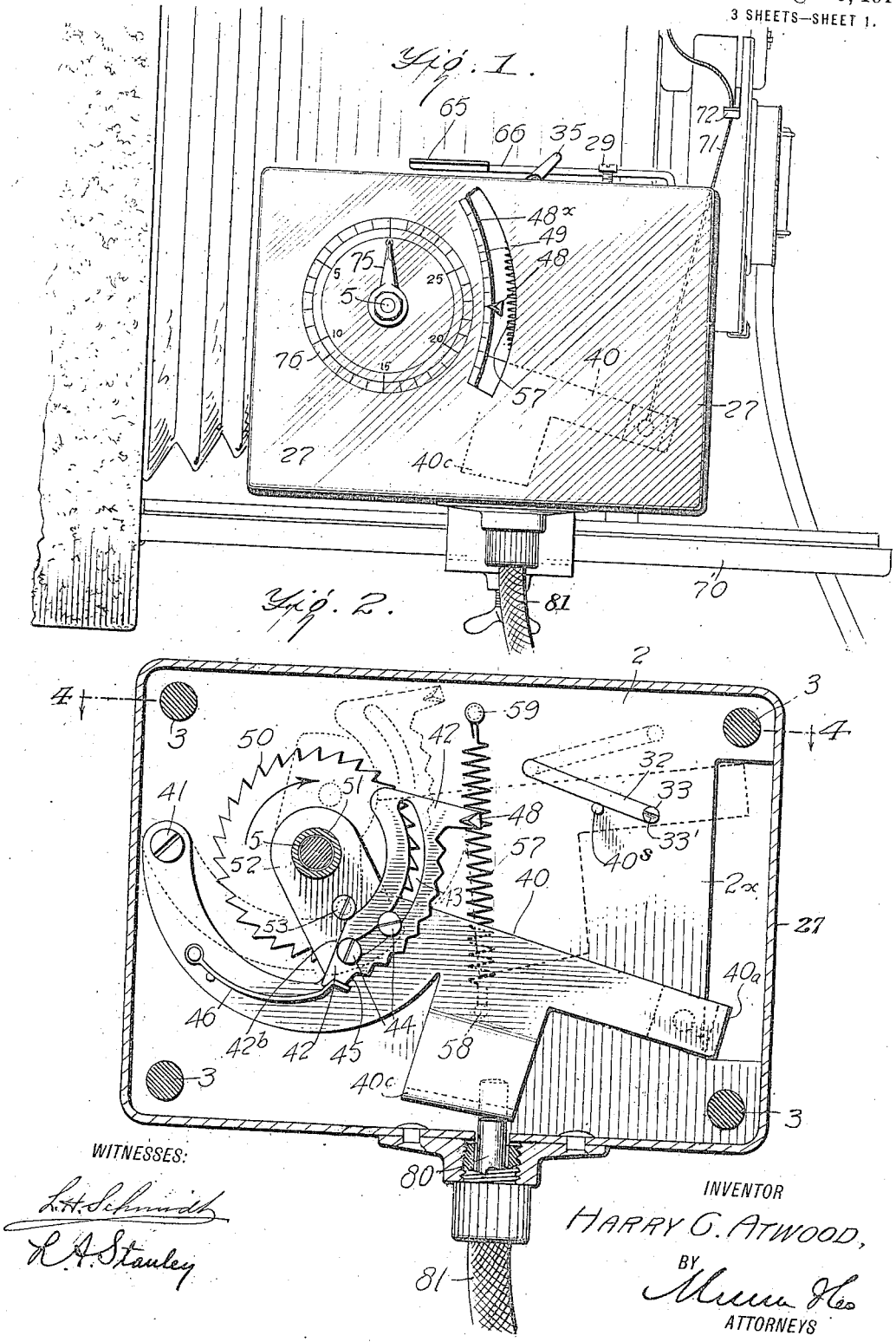

1,238,621.

Patented Aug. 28, 1917.
3 SHEETS—SHEET 2.

WITNESSES:
L. H. Schmidt
L. A. Stanley

INVENTOR
HARRY C. ATWOOD
BY Munn & Co.
ATTORNEYS

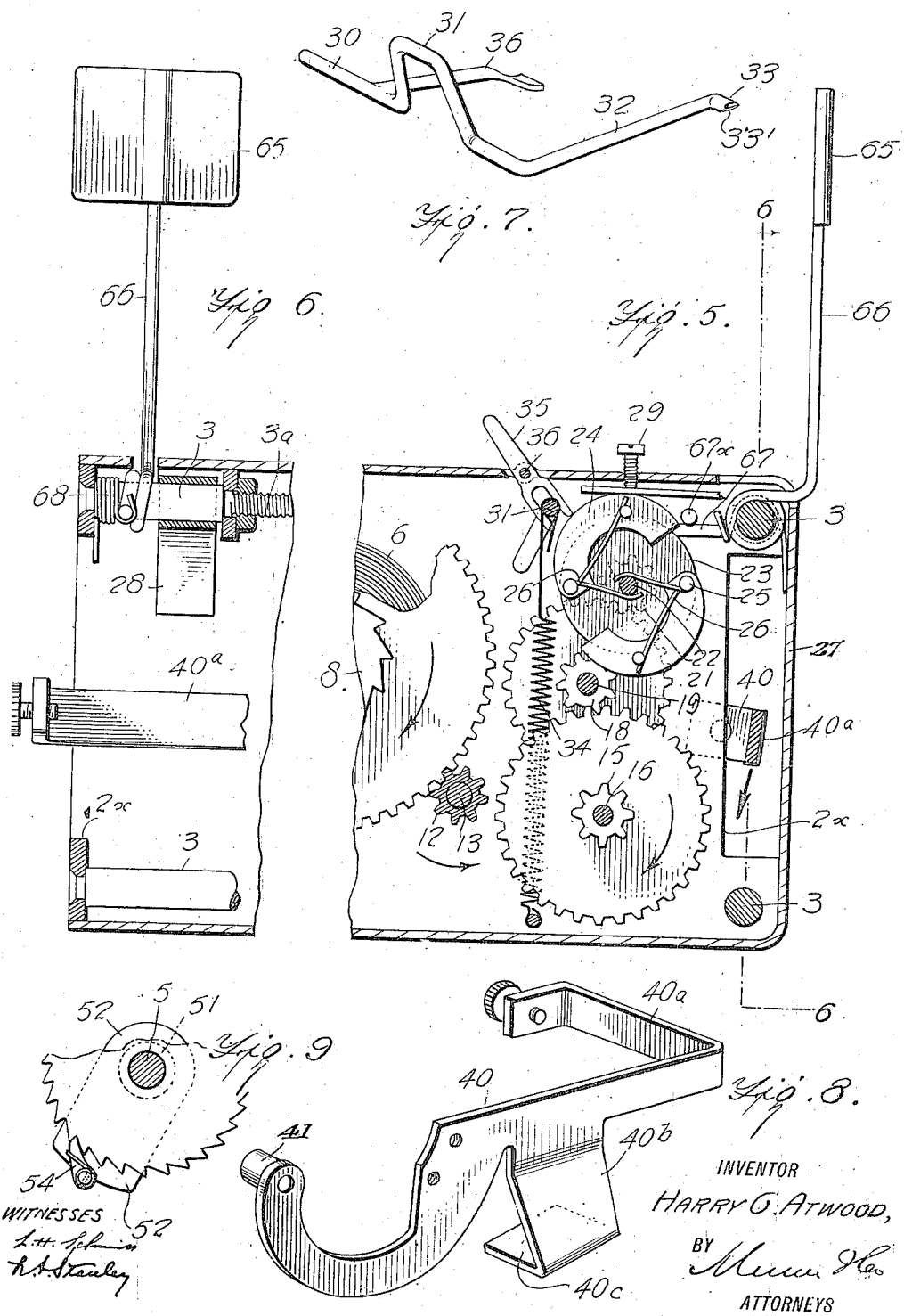

UNITED STATES PATENT OFFICE.

HARRY C. ATWOOD, OF ARDMORE, OKLAHOMA.

SHUTTER-OPERATING ATTACHMENT FOR CAMERAS.

1,238,621.   Specification of Letters Patent.   Patented Aug. 28, 1917.

Application filed July 12, 1916. Serial No. 108,768.

*To all whom it may concern:*

Be it known that I, HARRY C. ATWOOD, a citizen of the United States, and a resident of Ardmore, in the county of Carter and State of Oklahoma, have invented a certain new and useful Improvement in Shutter-Operating Attachments for Cameras; and it consists in the combinations, constructions, and arrangements hereinafter described and claimed.

An object of my invention is to provide a device which may be attached to the camera and by means of which an exposure may be automatically made after a predetermined time, thus allowing the operator of the camera to take his place within the range of the lens when the exposure is made and thus be included in the picture.

The main object of the invention is to provide a device of the type described having a trip arm which operates the shutter so that in its downward movement the motion is slow and continuous until the shutter is opened and the exposure concluded, after which the trip arm quickly returns to its original position closing the shutter and thus eliminating any possibility of jarring the camera and blurring the picture until the shutter is closed.

A further object of my invention is to provide a device of the type described which allows for instantaneous exposures or time exposures up to a certain limit and with which the exposure is timed accurately.

A further object of my invention is to provide a device of the type described which is small and compact requiring little more space than an ordinary watch.

Other objects and advantages will appear in the following specification and the novel features of the invention will be particularly pointed out in the appended claims.

My invention is illustrated in the drawings forming part of this application, in which—

Figure 1 is a side view of the device as applied to a camera;

Fig. 2 is a section along the line 2—2 of Fig. 4;

Fig. 5 is a section along the line 5—5 of Fig. 4;

Fig. 6 is a section along the line 6—6 of Fig. 5;

Fig. 7 is a perspective view of a rock shaft;

Fig. 8 is a perspective view of the trip arm, and

Fig. 9 is a section on the line 9—9 of Fig. 4.

Figure 4:
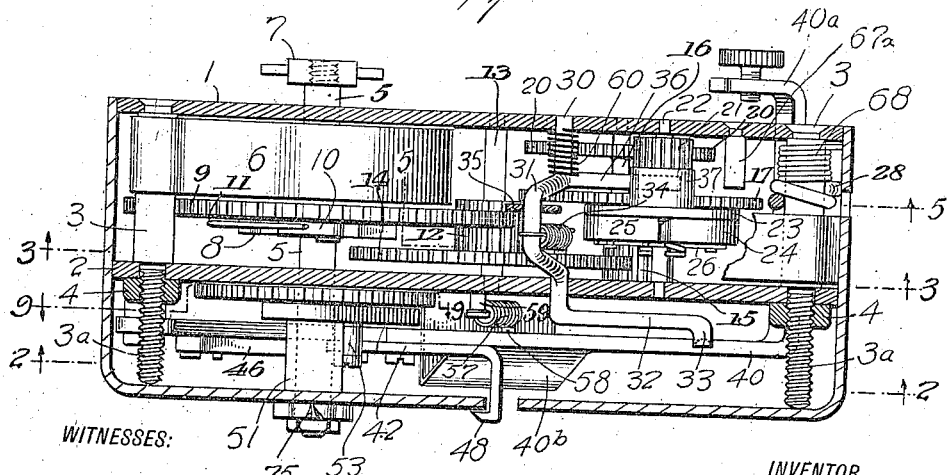
Fig. 4 is a section along the line 4—4 of Fig. 2.

Referring now more particularly to Fig. 4, it will be seen that I have provided a plate 1, and a second plate 2 parallel with the first mentioned plate. These plates are held in spaced relation by means of studs 3, whose ends are prolonged beyond the plate 2, and are threaded, as shown at $3^a$. Nuts 4 are provided for securing the plate 2 to the shouldered studs 3. At 5, I have shown the main drive shaft. A coiled spring 6 has one end fastened to the stud 3, and the other end to the shaft 5, so that when the shaft is rotated by means of the key 7, the spring is wound. A ratchet wheel 8 is keyed to the shaft 5, while a gear wheel 9 is loosely mounted on the shaft and is provided with a pawl 10, which is normally pressed upon by a spring 11 so as to hold it in engagement with the teeth of the ratchet 8.

Figure 3:
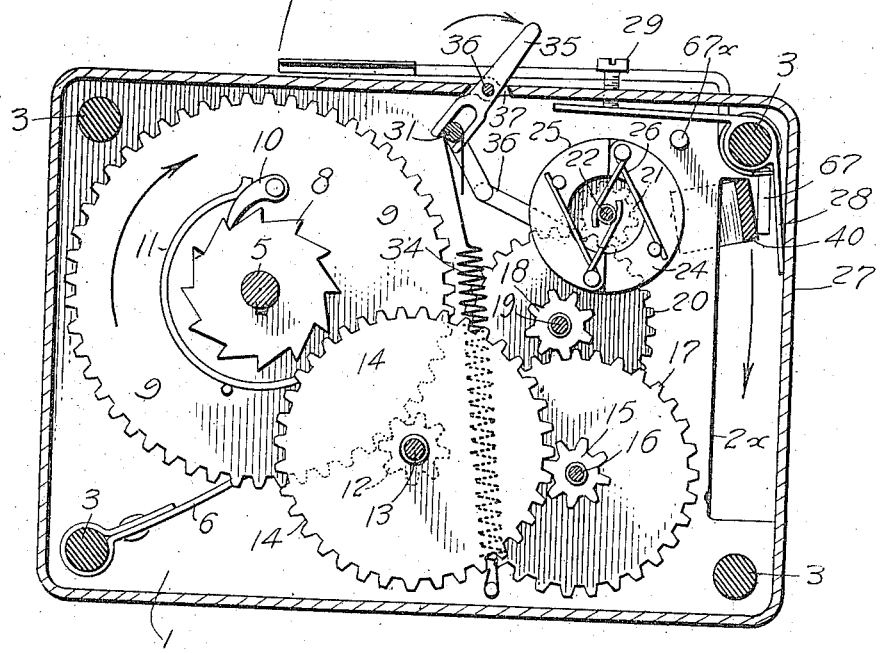
Fig. 3 is a section along the line 3—3 of Fig. 4.

As will be clearly seen from Fig. 3, the gear wheel 9 meshes with a pinion 12 on the shaft 13 which bears a gear 14 connected with a pinion 15 on a shaft 16, which bears a gear 17 in mesh with a pinion 18 on a shaft 19, the latter bearing a gear 20 in mesh with a pinion 21 of a shaft 22. The train of gears just mentioned provides means for increasing the speed of the shaft 22. The shaft 22 has a plate or disk 23 to which are pivotally mounted two semi-circular members 24 and 25, respectively, the former being pivotally mounted at $24^a$, and the latter being pivotally mounted at $25^a$. Springs 26 tend to normally hold the semi-circular members in the position shown in Fig. 3, but as the shaft rotates centrifugal action will cause the members 24 and 25 to fly apart, as shown in Fig. 5. As will be seen from Figs. 3 and 5, one of the studs 3 bears a spring one end of which bears against the inside of the casing 27, as shown at 28. The opposite end of the spring extends within the casing where its position may be regulated by means of a screw 29. During the rotation of the shaft 22, the members 24 and 25 are thrown outwardly by the centrifugal action, and thus come into engagement with the spring 28. This exerts a drag on the centrifugal members and tends to slow down the shaft 22. The members 24 and 25 constitute, together with the spring, a governor device for regulating the speed.

In Fig. 4, I have shown a rock shaft 30, which is journaled in the plates 1 and 2, and which has a U-shaped bent portion 31 and an extension 32 at one end having a laterally bent end 33. To the U-shaped portion 31 is attached one end of a spiral spring 34, the opposite end being attached to some fixed portion of the casing, as shown in Fig. 3. A shifting lever or handle 35 is pivotally mounted at 36 in a slot 37, and is provided with a forked end which straddles the U-shaped portion of the shaft 30. The shaft 30 is also provided with an arm 36, which is arranged to engage a friction drum 37 mounted on the shaft 22. It will be readily seen that when the lever 35 is in the position shown in Fig. 3, the arm 36 will be in engagement with the friction drum 37, and will therefore prevent the rotation of the shaft 22. When, however, the lever is swung over into the position shown in Fig. 5, then the arm 36 is withdrawn from the friction drum 37, thereby permitting the shaft 22 and the part associated with it to rotate freely.

Referring now particularly to Figs. 2, 4 and 8, I have shown therein a trip arm 40, which is pivoted at 41 and which is provided with a laterally extended portion 40ª, which is bent at its end into a plane parallel with the main body portion. The trip arm also has an extension 40ᵇ, which has a bent portion 40ᶜ. The trip arm 40 is provided with a slotted plate 42, whose slot 43 is curved. Holding and guide screws 44 secure the plate 42 in adjusted position with respect to the trip arm 40. One edge of the plate 42 is provided with a row of teeth 45, which are arranged to be engaged by a spring 46 as the plate 42 is shifted. The plate 42 has a projection or lateral extension 48, which extends through the casing and forms a pointer which plays over a dial 49. (See Fig. 1.)

A ratchet wheel is secured to the shaft 5. Loosely carried by the shaft 5 is a sleeve 51, to which is secured a plate 52. The latter bears a stud or pin provided with a roller 53 which is arranged to engage the curved edge of the plate 42 in the manner hereinbefore described. The plate 52 bears a pawl 54, which is arranged to engage the ratchet 50. A spiral spring 57 is secured at 58 to the trip arm 40 and at 59 to plate 2. As will be seen from Figs. 2 and 3, the latter plate has a cut away portion 2ˣ to permit the movement of the laterally bent portion of the trip arm 40. Referring now more particularly to Figs. 7 and 4, it will be seen that the end 33 of the rock shaft 30 is provided with a beveled portion 33' on its underside. This rock shaft has a spring 60 (see Fig. 4), which tends to keep the portion 33 in the path of the trip arm 40. The beveled portion 33', however, permits the rock shaft to be pushed against the tension of the spring 60, in a manner hereinafter described.

In order to indicate when an exposure is to be made I provide a signaling device, which will come into view just before the exposure is made, thus indicating to the persons to be photographed that the exposure is to be made and to prepare them for the exposure. This obviates the necessity of remaining in a fixed position, as must be done when one does not know when the exposure is to be made. As will be seen from Figs. 3 and 5, the signal consists of a plate 65 carried by an arm 66. This arm 66 is bent into a loop and terminates in an end 67 which rests against the end of the trip arm 40 in the normal position of the apparatus shown in Fig. 3. This signaling device is under the tension of a spiral spring 68 (see Fig. 4) tending to throw the signal into the position shown in Fig. 5, which position it will take when the trip arm 40 moves downwardly, in the manner hereinafter explained.

Referring now particularly to Figs. 1 and 2, it will be seen that I provide the device with two means of release, one to operate the finger trip of a camera having such a release, and the other to operate a pneumatic release. In Fig. 1, I have shown the casing 27 as secured to the drop door 70 of a folding camera. In this figure, the trip arm 40 shown in dotted lines is connected by means of the flexible member 71 with the actuating lever 72 of the camera.

From the foregoing description of the various parts of the device, the operation thereof may be readily understood. Assuming that a group picture is to be taken in which the operator is to be included, the mechanism is wound by means of the key 7, thus tightening the spring 6. There will be no movement of the mechanism, however, when the lever 35 in Fig. 3 is in the position shown in this figure, since the arm 36 is in frictional engagement with the drum 37. The indicator hand 75 is now moved over the dial 76, (see Fig. 1), and is put at any point on the dial which will allow the desired length of time to elapse after the mechanism has started until exposure is made. This pointer 75 is connected with the sleeve 51, which bears the plate 52, thus moving the pin bearing the roller 53 with respect to the end of the plate 42. The operator now moves the indicating hand 48 as many spaces on the scale 48ˣ (see Fig. 1) as seconds of time of exposure are desired. In case an instantaneous exposure is desired, he lets the pointer 48 remain at the top of the scale. The lever 35 is now moved from the position shown in Fig. 3 to that shown in Fig. 5. This permits the mechanism to start under the action of the spring 6. The operator now takes his place among the group.

The centrifugal governor prevents the device from running too fast, or rather it gives it a more uniform movement. The plate 52 is revolved through the medium of the ratchet 50 and the pawl 54 which is carried by the plate 52. The revolution of the plate 52 is shown by the arrow in Fig. 2, and during its revolution the roller pin 53 will engage the plate 42, which is carried by the trip arm 40. Owing to the fact that the pin 53 and the plate 42 which it engages move around different centers, the former around the axis of the shaft 5, and the latter around the pivotal part 41, the trip arm is pushed downwardly by means of the roller 53, with a gradual movement. When the end of the trip arm 40 passes the end 67 of the signaling device, then the latter is lifted into the position shown in Fig. 5, thus indicating to the company that exposure is about to be made. Let us assume that it is a time exposure and that the pointer 48 has been moved. Obviously, it will take longer for the roller 53 to reach the beveled end of the plate 42 if the pointer 48 is moved downwardly in Fig. 2. The trip arm 40 is forced downwardly in the manner explained until the roller 53 in Fig. 2 reaches the beveled portion 42$^b$ of the plate 42 when the trip arm flies upwardly under the tension of the spring 57. The upward movement of the trip arm 40 engages the end 33 of the rock arm 30, thereby forcing the end upwardly and restoring the rock arm to its original position shown in Fig. 3, thereby applying the arm 36 to the drum 37 and stopping the further action of the device.

The downward movement of the trip arm is a slow one and where the member 71 is attached to the trip lever of the camera, as shown at 72 in Fig. 1, there is a steady downward pull which prevents the shaking of camera.

I also provide the device with a pneumatic release. This consists of a push button 80, see Fig. 2, and a tube 81 which is designed to connect with the bulb release of the camera. This push button is engaged by the portion 43 of the trip lever on the down stroke of the latter. It is released when the trip lever or trip arm is brought back to its original position.

The purpose of beveling the underside of the end 33 of the rock shaft 30 is to permit the rock shaft to be rotated without moving the trip arm 40 downwardly. When the operator moves the lever 35 from the position shown in Fig. 3 to that shown in Fig. 5, the beveled surface 33′ of the end 33 rides over the upper edge of the trip arm 40 and the rock shaft is moved inwardly against the tension of the spring 60, see Fig. 4, until it reaches the full line position shown in Fig. 2, where the portion 32 rests against a stop 40$^s$ carried by the trip arm 40. When, however, the trip arm is moved downwardly in the manner described, the rock shaft will spring outwardly so that the end 33′ comes in the path of the trip arm 40 on its return and will be moved upwardly into its initial position. The provision of a stop 67$^x$ limits the movement of the signaling device by the engagement of the end 67 with the stop as shown in Fig. 5.

I claim:

1. A shutter operating attachment for cameras, comprising a casing, a shaft rotatably disposed therein, spring means for rotating the shaft, a trip arm pivoted at one end, a plate mounted for rotation on the shaft, a pin carried by the plate and arranged to engage a portion of the trip arm, a spring for resisting the movement of the trip arm by the pin, means for regulating the amount of movement of the trip arm, said last mentioned means comprising an adjustable plate carried by the trip arm and adapted to be moved with respect to the pin.

2. A shutter operating attachment for cameras, comprising a casing, a shaft rotatably disposed therein, spring means for rotating the shaft, a trip arm pivoted at one end, a plate mounted for rotation on the shaft, a pin carried by the plate and arranged to engage a portion of the trip arm, a spring for resisting the movement of the trip arm by the pin, means for regulating the amount of movement of the trip arm, said last mentioned means comprising an adjustable plate carried by the trip arm and adapted to be moved with respect to the pin, and means for retaining the adjustable plate in its shifted position.

3. A shutter operating attachment for cameras, comprising a casing, a shaft rotatably disposed therein, spring means for rotating the shaft, a trip arm pivoted at one end, a plate mounted for rotation on the shaft, a pin carried by the plate and arranged to engage a portion of the trip arm, a spring for resisting the movement of the trip arm by the pin, means for regulating the amount of movement of the trip arm, said means comprising a plate having a curved slot, pins carried by said trip arm and arranged to extend through said slot, and a friction member arranged to engage the edge of the plate.

4. A shutter operating attachment for cameras, comprising a casing, a shaft rotatably disposed therein, means for rotating the shaft, a trip arm pivoted at one end, a plate mounted for rotation on the shaft, a pin carried by the plate and arranged to engage a portion of the trip arm, a spring for resisting the movement of the trip arm by the pin, means for regulating the amount of movement of the trip arm, said means comprising a plate having a curved end slot, pins carried by said trip arm and arranged to extend through said slot, a friction member arranged to engage the edge of the plate, said friction member comprising a spring having a V-shaped end arranged to enter V-shaped notches in the edge of said plate.

5. A shutter operating attachment for cameras, comprising a casing, a shaft rotatably disposed therein, spring means for rotating the shaft, a trip arm pivoted at one end, a plate mounted for rotation on the shaft, a pin carried by the plate and arranged to engage a portion of the trip arm, a spring for resisting the movement of the trip arm by the pin, means for regulating the amount of movement of the trip arm, said means comprising a plate having a curved end slot, pins carried by said trip arm and arranged to extend through said slot, said friction member comprising a spring having a V-shaped end arranged to enter V-shaped notches in the edge of said plate, said plate having an extention arranged to pass through an opening in the casing and constituting a pointer.

HARRY C. ATWOOD.

Copies of this patent may be obtained for five cents each, by addressing the "Commissioner of Patents, Washington, D. C."